United States Patent
Du et al.

(10) Patent No.: US 7,801,260 B2
(45) Date of Patent: Sep. 21, 2010

(54) PEAK DETECTION ACCURACY

(75) Inventors: Yonggang Du, Shanghai (CN); Li Sun, Shanghai (CN)

(73) Assignee: ST-Ericsson SA, Geneva (CH)

( * ) Notice: Subject to any disclaimer, the term of this patent is extended or adjusted under 35 U.S.C. 154(b) by 895 days.

(21) Appl. No.: 10/480,114

(22) PCT Filed: Jun. 13, 2002

(86) PCT No.: PCT/IB02/02255

§ 371 (c)(1),
(2), (4) Date: Dec. 9, 2003

(87) PCT Pub. No.: WO02/103946

PCT Pub. Date: Dec. 27, 2002

(65) Prior Publication Data

US 2004/0151261 A1    Aug. 5, 2004

(30) Foreign Application Priority Data

Jun. 18, 2001    (WO) .................. PCT/IB01/01533

(51) Int. Cl.
H04L 7/06    (2006.01)
H04L 27/06    (2006.01)
H03J 3/06    (2006.01)

(52) U.S. Cl. .................. 375/364; 375/343; 370/511

(58) Field of Classification Search .................. 375/144, 375/150, 343, 345, 350, 143, 149, 152, 354, 375/368, 357, 362–365, 377; 370/509–514, 370/224, 350, 520, 503; 455/21.2
See application file for complete search history.

(56) References Cited

U.S. PATENT DOCUMENTS

| | | | | |
|---|---|---|---|---|
| 3,609,683 A | * | 9/1971 | Hoffman et al. | 340/146.2 |
| 4,275,348 A | * | 6/1981 | Bayer et al. | 324/615 |
| 4,621,365 A | * | 11/1986 | Chiu | 375/149 |
| 4,653,076 A | * | 3/1987 | Jerrim et al. | 375/367 |
| 4,910,521 A | * | 3/1990 | Mellon | 342/45 |
| 5,430,760 A | * | 7/1995 | Dent | 375/144 |
| 5,539,783 A | * | 7/1996 | Papson | 375/355 |
| 5,544,155 A | * | 8/1996 | Lucas et al. | 370/342 |

(Continued)

FOREIGN PATENT DOCUMENTS

EP    0565507    10/1993

(Continued)

*Primary Examiner*—Tesfaldet Bocure
*Assistant Examiner*—Lawrence B Williams

(57) ABSTRACT

A time reference point can be determined in a radio system by sending a synchronization sequence $s(i)$, $i=0, \ldots N-1$, from transmitter X, 40 to receiver Y, 48, and by detecting the peak value at the output of a matched-filter, 44, $h(i)=s(N-1-i)$ on Y. In practical systems the accuracy of this peak detection is limited by interference and noise on the radio channel. To increase the peak detection accuracy, we propose to repeat the transmission of the same synchronization sequence K times. The interval L between repetitions is constant and the amplitude of the synchronization sequence in each repetition varies according to a given variation pattern $a(jL)$, $j=0, \ldots, K-1$. The receiver Y, 48 knows L and $a(jL)$, $j=0, \ldots, K-1$. After comparison to a threshold, the matched-filter 44 at the receiver 48 may deliver peaks resulted from repeatedly received synchronization sequences or peaks caused by interference and/or noise.

12 Claims, 1 Drawing Sheet

U.S. PATENT DOCUMENTS

| | | | |
|---|---|---|---|
| 5,896,423 A * | 4/1999 | Okamoto | 375/345 |
| 6,389,056 B1 * | 5/2002 | Kanterakis et al. | 375/130 |
| 6,430,395 B2 * | 8/2002 | Arazi et al. | 455/41.2 |
| 6,507,601 B2 * | 1/2003 | Parsa et al. | 375/141 |
| 6,546,062 B1 * | 4/2003 | Du et al. | 375/342 |
| 6,549,564 B1 * | 4/2003 | Popovic | 375/142 |
| 6,594,248 B1 * | 7/2003 | Karna et al. | 370/342 |
| 6,597,675 B1 * | 7/2003 | Esmailzadeh et al. | 370/335 |
| 6,625,138 B2 * | 9/2003 | Karna et al. | 370/342 |
| 6,738,443 B1 * | 5/2004 | Bohnke et al. | 375/364 |
| 6,961,352 B2 * | 11/2005 | Bouquier et al. | 370/503 |
| 7,016,400 B2 * | 3/2006 | Goto | 375/150 |
| 7,016,442 B2 * | 3/2006 | Nakamura et al. | 375/354 |
| 7,508,861 B2 * | 3/2009 | Kanterakis et al. | 375/141 |
| 2001/0040884 A1 * | 11/2001 | Bouquier et al. | 370/350 |
| 2003/0156603 A1 * | 8/2003 | Rakib et al. | 370/485 |

FOREIGN PATENT DOCUMENTS

| | | |
|---|---|---|
| WO | WO9827684 | 6/1998 |

* cited by examiner

PEAK DETECTION ACCURACY

CROSS-REFERENCE TO RELATED APPLICATION(S)

The present application claims priority under 35 U.S.C. §365 to International Patent Application No. PCT/IB02/02255 filed Jun. 13, 2002, entitled "PEAK DETECTION ACCURACY". International Patent Application No. PCT/IB02/02255 claims priority under 35 U.S.C. §365 and/or 35 U.S.C. §119(a) to International Patent Application No. PCT/IB01/01533 filed Jun. 18, 2001 and which are incorporated herein by reference into the present disclosure as if fully set forth herein.

TECHNICAL FIELD

This invention relates to a method of peak detection in an electrical signal and apparatus therefor.

BACKGROUND

Peak detection at a matched-filter output in a radio transmitter X, as shown in FIG. 1, is widely used to determine a time reference point in a radio system having radio transmitter X and a radio receiver Y, where the matched-filter is matched to a synchronization sequence $s(i)$, $i=0, \ldots, N-1$, which has a good auto-correlation property. For example, m-sequences and Gold-sequences (M. K. Simon etc Spread Spectrum Communication Handbook, revised edition, New York, McGraw Hill Inc, 1994) have this desired property. In FIG. 1 a signal generator 10 in a transmitter 12 sends the synchronization sequence over a channel 14 to a receiver 16, a matched filter 18 of which correlates the filter transfer function with the input signal. The peak of the correlation function appearing at the matched-filter output is detected in a peak detection section 19. The transfer function $h(i)$ of the matched-filter is $h(i)=s(N-1-i)$, $i=0, \ldots, N-1$. In ideal situations a peak would appear at time $t=t_0+N-1$ at the matched-filter output of the receiver, where to is the radio propagation time from X to Y. If after a fixed processing time T the same synchronization sequence is transmitted from Y to X, the transmitter X will detect a peak at $t=2(t_0+N-1)+T$ at its matched-filter output. Assuming X knows T, it can easily derive the distance from the round-trip delay $2t_0$ and the speed $V_0=30$ km/s of the electromagnetic wave. Estimation of distance such as this is one example of the application of peak detection methods.

The transmitted synchronization signal on the channel can be expressed as $$s(t) = \sum_{i=0}^{N-1} s(i)\delta(t-i),$$

and the transfer function of the matched-filter as $$h(t) = \sum_{i=0}^{N-1} s(N-1-i)\delta(t-i),$$

where $\delta(t)$ is the diracs delta function (impulse) (A V Oppenheim, Digital Signal Processing, Prentice-Hall, Inc, 1975).

Peak detection is usually done by the comparison of the matched-filter output value $y(t)$ to a threshold $\Phi$. Like any linear filter, the matched-filter output is obtained through the convolution $y(t)=s(t)*h(t)$ (John G Proakis, Digital Communication. 3rd Edition McGraw-Hill Inc, 1995). In ideal situations the matched-filter would yield the maximum $P_m=E_s$ at $t=t_0+N-1$, where $E_s$ is the energy of $s(i)$. In practical systems, the matched-filter is exposed to interference and noise on the channel, therefore, more than one matched-filter output value may exceed $\Phi$, provided that $\Phi$ is set so that the probability to detect a correct peak is not zero. Sometimes the peak caused by interference and/or noise can be even higher than the real peak. Sometimes a real peak may not be detected due to suppression by interference and/or noise.

Disadvantages arise with this existing method because the peak may not be found if the signal to noise ratio is too poor. It is an object of the present invention to address the problem of accurate peak detection by providing a more accurate method of peak detection.

According to a first aspect of the present invention a method of detecting a peak/trough in an electrical signal includes sending a synchronization signal from a transmitter for reception by a receiver, wherein the synchronization signal includes a synchronization sequence repeated with a predetermined time interval between repeats and the amplitude of the synchronization sequence is varied between repeats.

The predetermined time interval may be substantially constant.

SUMMARY

Advantageously the repetition of the synchronization sequence and variation of the amplitude of the sequence allows more accurate correlation of a received signal with the transmitted signal to detect a peak or trough in the synchronization signal.

The amplitude of the signal may be varied by a weighting factor, which weighting factor may have a mean of approximately zero and may have an energy normalized to approximately 1. The weighting factor may be an amplitude variation function or time sequence and may have the form $a(jL)$, where L is the predetermined time interval between repeats of the synchronization sequence and $j=0, \ldots, K-1$.

Preferably, the synchronization signal is received by a correlator or matched filter of the receiver, which receiver preferably detects peaks, preferably with a first peak detector, by a comparison with a predetermined threshold, $\phi$. The receiver preferably has an amplitude correlator for correlating the amplitude variation.

References herein to detection of a peak, may also be constructed as references to a trough in a signal.

For each correlator/matched-filter output value $y'(t_q)$ above a threshold, $\phi$, at time $t_q$ the amplitude correlator preferably correlates 2K-1 output values, preferably from $y'(t_q-jL)$ to $y'(t_q+jL)$, of the matched-filter/correlator with the amplitude variation function $a(jL)$, $j=0, \ldots K-1$. The output values are preferably substantially equidistant, preferably separated by L. It is very important to note that $y'(t_q)$ is a detected peak of the correlator/matched-filter, but any matched filter sample between $y'(t_q-jL)$ and $y'(t_q+jL)$ $j=1 \ldots, K-1$ is not necessarily a detected peak of the correlator/matched-filter. The amplitude correlator preferably takes $y'(t_q)$ and the other preferably 2K-1 values preferably from $y'(t_q-jL)$ to $y'(t_q+jL)$, $j=1, \ldots, K-1$, from the matched-filter/correlator to compute a correlation function with K known weighting factors $a(jL)$.

The maximal correlation values from each set of K amplitude correlator outputs for each detected synchronization sequence are preferably then compared against a second threshold, $\theta$. Values exceeding the second threshold advantageously give a high probability of detecting an intended peak, to thereby give an intended time reference point.

The receiver then preferably transmits the synchronization signal to the transmitter, preferably at a predetermined delay (T), preferably known to the transmitter, the synchronization signal preferably being known to the receiver. A matched filter of the transmitter preferably receives the signal from the receiver.

The transmitter preferably receives the re-sent signal from the receiver and preferably processes the received signal in the same way as described above in relation to the receiver.

The transmitter then preferably determines the propagation delay time, $t_0$, between the transmitter and receiver from the detection time ($t'_{m,s}$) of the peak at the output of the amplitude correlator, the predetermined retransmission delay time (T), and a start time $t_s$ of the transmission of the synchronization signal, preferably based on $t'_{m,s} = t_s + T + 2(t_0 + N - 1)$. Here, $t'_{m,s}$ denotes a reference time which points to the end of the $1^{st}$ received synchronization sequence in each sent synchronization signal.

The duration of the delay between repeats of the synchronization sequence may be greater than the length of the synchronization sequence.

According to a second aspect of the present invention a system for detecting a peak/trough in an electrical signal comprises a transmitter and a receiver, wherein the transmitter is operable to send a synchronization signal to the receiver, which synchronization signal includes a synchronization sequence that is repeated with a predetermined time interval between repeats, and the amplitude of the synchronization sequence is varied between repeats.

The receiver may include at least one correlator/matched filter, preferably matched to the form of the synchronization sequence. The receiver preferably includes an amplitude correlator. The transmitter preferably includes at least one matched filter.

The transmitter and receiver may form a positioning system, a ranging system, a delay estimation system, a synchronization system, a time advance system and/or a target detection system operable to perform the steps disclosed in the first aspect.

All of the features described herein may be combined with any of the above aspects, in any combination.

BRIEF DESCRIPTION OF THE DRAWINGS

For a better understanding of the present invention and to show how embodiments of the same may be brought into effect a specific embodiment will now be described with reference to the accompanying drawings, in which.

DETAILED DESCRIPTION

Figure 3:
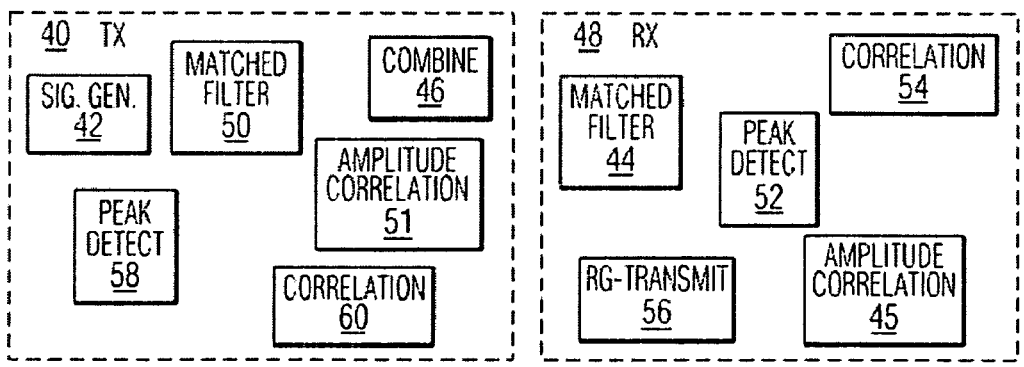
FIG. 3 is a schematic diagram of a peak detection system according to the invention.

As shown in FIG. 3, a time reference point can be determined in a radio system by sending a synchronization sequence s(i), i=0, ... N-1, from transmitter X, 40 to receiver Y, 48, and by detecting the peak value at the output of a matched-filter, 44, h(i)=s(N-1-i) on Y. In practical systems the accuracy of this peak detection is limited by interference and noise on the radio channel. To increase the peak detection accuracy, we propose to repeat the transmission of the same synchronization sequence K times. The interval L between repetitions is constant and the amplitude of the synchronization sequence in each repetition varies according to a given variation pattern a(jL), j=0, ..., K-1. The receiver Y, 48 knows L and a(jL), j=0, ..., K-1. After comparison to a threshold, the matched-filter 44 at the receiver 48 may deliver peaks resulted from repeatedly received synchronization sequences or peaks caused by interference and/or noise.

To discriminate real peaks from unwanted peaks, each matched-filter output peak $y'(t_q)$ determines 2K-1 equidistant matched-filter output samples from $y'(t_q - iL)$ to $y'(t_q + iL)$ i=1, ..., K-1, to be fed to an amplitude correlator 45, that is matched to a(jL), j=0 ... K-1. With these inputs, the amplitude correlator 45 computes K correlation values with a(jL), j=0, ... K-1. The n-th correlation value is computed to meet the assumption that $y'(t_q)$ is the peak expected at the end of the n-th received synchronization sequence in a repetition train. This is done by correlating K input samples $y'(t_q - (n-1)L + jL)$ with a(jL), j=0, ... K-1. If the s-th correlation value $z(t_q - (s-1)L)$ is the maximum of these K correlation values, the receiver 48 will record $z(t_q - (s-1)L)$ as the maximal correlation value associated with $y'(t_q)$, together with the corresponding correlation start time $t_{q,s} = t_q - (s-1)L$.

Doing so, all peaks $y'(t_i)$ detected at any time $t_i$ at the matched-filter output will result in a corresponding maximal correlation value $z(t_{i,s})$ at correlation start time $t_{i,s} = t_i - (s-1)L$. Now, as shown in FIG. 3, a peak detector 52 following the amplitude correlator 45 compares all maximal correlation values $z(t_{i,s})$ to a second threshold. If a particular $y'(t_m)$ is indeed the peak at the end of the s-th received synchronization sequence, $z(t_{m,s})$ associated with this $y'(t_m)$ must be statistically very large, and thus exceeds the second threshold with high probability. The correlation start time $t_{m,s}$ at which the amplitude correlator 45 yields $z(t_{m,s})$ defines a time reference point, which most probably points to the end of the first received synchronization sequence.

More specifically, in a method of peak detection and as shown in FIG. 3, matched filter 44 and amplitude correlator 45 are used in a receiver 48. A synchronization sequence s(i), i=0, ..., N-1, is sent out K times from a transmitter. An interval L between two adjacent synchronization sequences is constant and known to a receiver, but the amplitude of each synchronization sequence $s_j(i)$, j=0, ..., K-1 now varies according to a(jL) $s_j(i)$, i=0, ..., N-1. Without loss of generality, the energy of a(jL) can be normalized to unity, and the mean of a(jL) is zero, i.e.

$$\sum_{j=0}^{K-1} a^2(jL) = 1, \quad \sum_{j=0}^{K-1} a(jL) = 0.$$

The composite synchronization signal s'(t) at the output of the transmitter can thus be expressed as:

$$s'(t) = \sum_{i=0}^{N-1} s_i(i)\delta(t-i) * \sum_{j=0}^{K-1} a(jL)\delta(t-jL),$$

where * indicates a convolution operation.

In ideal situations (ie no interference and noise) K peaks of y'(t)=s'(t)*h(t) (where y' (t) is the output of the first matched filter 44 and h(t) is the transfer function of the first matched filter 44, as described in relation to the matched filter 18 in the introduction) would appear at t=$t_0$+N−1+jL, j=0, . . . , K−1, as:

$$P'_m(t) = \sum_{j=0}^{K-1} a(jL) P_m \delta(t - (t_0 + N - 1) - jL)$$

In real radio environment a threshold φ must be used to define any matched-filter sample y'($t_i$)>φ as a peak. The so defined peaks may be a wanted peak a(jL)$P_m$ appearing at the end of the j-th synchronization sequence. They may also be a peak caused by interference and/or noise. Additionally, these detected peaks may not cover all wanted peaks that are expected at the end of each received synchronization sequence, due to the suppression effect of interference and/or noise. However, the known weighting factors a(jL), j=0, . . . , K−1, of the wanted peaks make it easier to discriminate wanted peaks from unwanted peaks caused by interference and/or noise. Assume that in practical systems there are Q detected peaks y'($t_q$)>φ, q=1, . . . , Q, of which some may be unwanted peaks caused by interference and/or noise. The receiver now takes each detected peak y'($t_q$) at $t_q$ and K−1 equidistant matched-filter output samples y'($t_q$−jL) before y'($t_q$) as well as K−1 equidistant matched-filter output samples y'($t_q$+jL) after y'($t_q$), j=1, . . . , K−1, to compute K correlation values with the known amplitude weighting factors a(jL), j=0, . . . K.

It is important to note that y'($t_q$) may not be a wanted peak and the K−1 equidistant matched-filter output samples y'($t_q$−jL)/y'($t_q$+jL) before/after y'($t_q$) may be and may not be a detected peak. However, if y'($t_q$) is a wanted peak, the receiver can always yield a perfect match between a(jL), j=0, . . . K, and the amplitudes of the K wanted peaks, if it tries out K different correlations. The n-th correlation is computed under the assumption that y'($t_q$) is the peak expected at the end of the n-th received synchronization sequence. A perfect match is reached if in the correlation computation a(jL) hits the position of the peak resulted from the j-th received synchronization sequence in a composite synchronization signal s'(t). So, as shown in FIG. 3. the receiver 48 starts the 1st correlation under the assumption that y'(t.sub.q) is the peak expected at the end of the 1st received synchronization sequence. The first correlation value $$z(t_q) = \sum_{j=0}^{K-1} a(jL) y'(t_q + jL)$$

is thus obtained by correlating y'($t_q$) and K−1 following matched-filter output samples y'($t_q$+jL) with a(jL). Consequently, the n-th correlation value z($t_q$−(n−1)L) is obtained under the assumption that y'($t_q$) is the peak expected at the end of the n-th received synchronization sequence. This is done by correlating K matched-filter output samples y'($t_q$−(n−1)L+jL) with a(jL), j=0, . . . K−1, $$z(t_q - (n-1)L) = \sum_{j=0}^{K-1} a(jL) y'(t_q - (n-1)L + jL)$$

If the s-th correlation value z($t_q$−(s−1)L) is the maximum of the K correlation values, the receiver will record z($t_q$−(s−1)L) as the maximal correlation value associated with y'($t_q$), together with the corresponding correlation start time $t_{q,s}$=$t_q$−(s−1)L. If more than one correlation value associated with y'($t_q$) gives the same maximal correlation value, one of them is randomly chosen as z($t_q$−(s−1)L).

Doing so, all peaks y'($t_i$) detected at any time $t_i$ at the matched-filter output will result in a corresponding maximal correlation value z($t_{i,s}$) at the output of the amplitude correlator. The corresponding correlation start time is $t_{i,s}$=$t_i$−(s−1)L. It is obvious that if y'($t_i$) is indeed a wanted peak at the end of the s-th received synchronization sequence, the associated maximal correlation value z($t_{i,s}$) must be statistically very large because of the perfect match. Furthermore, because ti points to the end of the s-th received synchronization sequence, $t_{i,s}$=$t_i$−(s−1)L automatically points to the end of the 1 st received synchronization sequence.

The desired time reference point $t_{i,s}$ can be determined, if a peak detector following the amplitude correlator compares all maximal correlation values z($t_{i,s}$) to a second threshold θ. It is possible to choose θ such that all z($t_{m,s}$)'s exceeding θ define a time reference point and, with high probability, the corresponding correlation start times $t_{m,s}$ point to the end of the 1st received synchronization sequence a(0)$s_0$(i) in a composite synchronization signal s'(t).

Note, if two wanted peaks y'($t_1$) and y'($t_2$) belonging to the same composite synchronization signal s'(t) give z($t_{m1,s1}$)>θ and z($t_{m2,s2}$)>θ, then $t_{m1,s1}$=$t_{m2,s2}$, if z($t_{m1,s1}$) and z($t_{m2,s2}$) are the correlation values of the perfect match for y'($t_{m1}$) and y'($t_{m2}$), respectively.

Many applications can be found for this new time reference point detection method. For example, to determine the round trip time 2 $t_0$, the receiver can start the transmission of the same composite synchronization signal s'(t) at t=$t_{m,s}$+T. The transmitter can then assume that the maximal correlation value z($t_{m,s}$)>θ detected at its amplitude correlator output appears at $t_{m,s}$=2($t_0$+N−1)+T, provided it has started the transmission of the 1$^{st}$ synchronization sequence at t=0. Thus, $t_0$ is determined.

Figure 1:
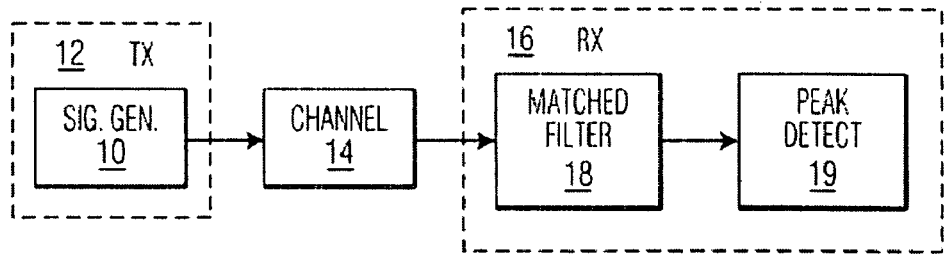
FIG. 1 is a diagram of a conventional peak detection system.
Figure 2:
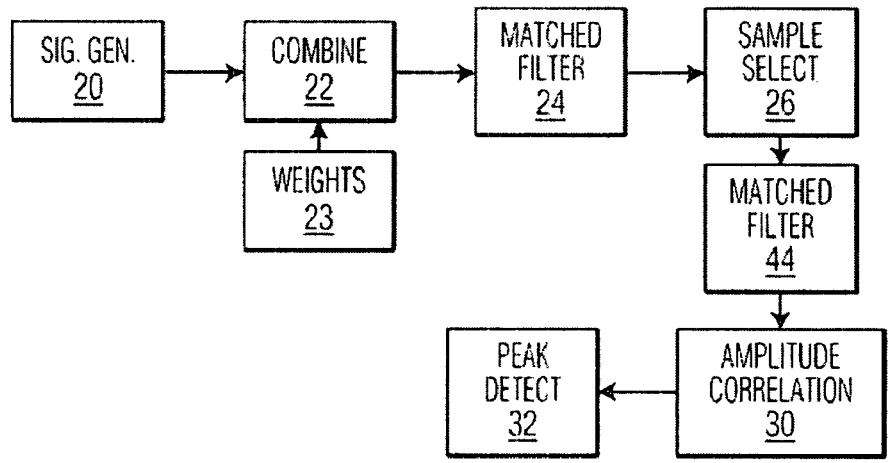
FIG. 2 is a flow diagram of a method of peak detection according to the invention.

In general, there is no requirement that L>N−1. However for L>N−1 the wireless system for the new peak detection method can be simplified as in FIG. 2, in which a signal generator 20 generates the synchronization sequence. passes the sequence to a combiner at 22 which adds the weighting factor 23. At 24 the signal is transmitted. At 268 the sample selection is performed, followed matched filtering at the matched filter 44 of the receiver, by amplitude correlation at 30, and by peak detection at 32.

The method disclosed herein is applicable to use in a variety of systems and devices, shown generally in FIG. 3, which may include a positioning system, a ranging system, a delay estimation system, a synchronization system, a time advance system and/or a target detection system or devices for all of the above. In FIG. 3 a transmitter 40 is shown having a signal generator 42, first matched filter 50, amplitude correlator 51, signal combiner 46, peak detection means 58 and correlation means 60 and a receiver 48 having a first matched filter 44, amplitude correlator 45, peak detection means 52, correlation means 54 and retransmission means 56.

The method and devices disclosed herein have significant advantages over prior art systems and methods in that both repetition of the synchronization sequence and repetition at different amplitudes allows more accurate peak detection and therefore more accurate ranging etc based on the speed of propagation of the wave and the round trip from transmitter to receiver and back.

What is claimed is:

1. A method comprising:
    sending a synchronization signal from a transmitter for reception by a receiver, the synchronization signal including a synchronization sequence that produces a matched-filter-based peak or trough at the receiver,
    repeating the synchronization sequence with a substantially constant, predetermined time interval between repeats, and
    varying the amplitude of the synchronization sequence between repeats by a weighting factor.

2. A method as claimed in claim 1, in which the weighting factor is an amplitude variation function or time sequence having the form a(jL), where L is the predetermined time interval between repeats of the synchronization sequence and $j=0 \ldots, K-1$, K being a number of repetitions of the synchronization sequence.

3. A method as claimed in claim 1, in which the synchronization signal is received by a correlator or matched filter of the receiver, which detects peaks with a first peak detector by comparison with a predetermined threshold, $\Phi$.

4. A method as claimed in claim 3, in which the receiver has an amplitude correlator for correlating the amplitude variation.

5. A method as claimed in claim 4, in which for each matched filter or correlator output value $y'(t_q)$ above the threshold $\Phi$, at time $t_q$, the amplitude correlator correlates 2K-1 output values, from $y'(t_q\text{-}jL)$ to $y'(t_q\text{+}jL)$, of the matched filter or correlator with an amplitude variation function a(jL), $j=0 \ldots K-1$: where L is the predetermined time interval between repeats of the synchronization sequence.

6. A method as claimed in claim 5, in which the output values are substantially equidistant.

7. A method as claimed in claim 3, comprising:
    determining maximum correlation values for each set of K matched filter or correlator outputs for each detected synchronization sequence, and
    comparing the maximum correlation values against a second threshold, $\theta$.

8. A method as claimed in claim 1, in which a duration of a delay between repeats of the synchronization sequence is greater than the length of the synchronization sequence.

9. A system for detecting a peak/trough in an electrical signal comprising:
    a transmitter operable to send a synchronization signal to a receiver, the synchronization signal including a synchronization sequence, and
    a receiver including a matched filter that is matched to the synchronization sequence so as to produce a peak/trough in response to receiving the synchronization sequence,
    wherein the synchronization sequence is repeated with a substantially constant, predetermined time interval between repeats, and the amplitude of the synchronization sequence is varied between repeats by a weighting factor.

10. A system as claimed in claim 9, wherein produced peak/troughs are used to calculate round-trip delay of a signal sent between the transmitter and receiver.

11. A system as claimed in claim 9, in which the receiver includes an amplitude correlator.

12. A system as claimed in claim 9, in which the transmitter and receiver form a positioning system, a ranging system, a delay estimation system, a synchronization system, a time advance system or a target detection system.

* * * * *